(12) United States Patent
Turetzkey et al.

(10) Patent No.: US 9,235,929 B2
(45) Date of Patent: Jan. 12, 2016

(54) SYSTEMS AND METHODS FOR EFFICIENTLY PROCESSING VIRTUAL 3-D DATA

(71) Applicant: 1-800 Contacts, Inc., Draper, UT (US)

(72) Inventors: Darren Turetzkey, Cedar Park, TX (US); Ryan Travis Engle, Pflugerville, TX (US)

(73) Assignee: Glasses.com Inc., Mason, OH (US)

( * ) Notice: Subject to any disclaimer, the term of this patent is extended or adjusted under 35 U.S.C. 154(b) by 186 days.

(21) Appl. No.: 13/774,978

(22) Filed: Feb. 22, 2013

(65) Prior Publication Data

US 2013/0314411 A1 Nov. 28, 2013

Related U.S. Application Data

(60) Provisional application No. 61/650,983, filed on May 23, 2012, provisional application No. 61/735,951, filed on Dec. 11, 2012.

(51) Int. Cl.
*G06T 17/00* (2006.01)
*G06T 19/00* (2011.01)
*G06T 15/04* (2011.01)
(Continued)

(52) U.S. Cl.
CPC .......... *G06T 17/00* (2013.01); *G06K 9/00221* (2013.01); *G06K 9/46* (2013.01); *G06T 15/04* (2013.01); *G06T 19/00* (2013.01);
(Continued)

(58) Field of Classification Search
CPC .......... G06K 9/00221; G06K 9/00201; G06K 9/00248; G06K 9/00268; G06K 9/4661; G06K 9/00261; G06K 9/00335; G06K 9/00208; G06K 9/00214; H04N 1/00307; H04N 5/23219; H04N 21/23412; G06T 17/00; G06T 2207/30201; G06T 13/40; G06T 15/04; G06T 2200/08; G06T 19/00; G06T 19/20; G06T 11/001; G06T 15/00
See application file for complete search history.

(56) References Cited

U.S. PATENT DOCUMENTS 3,927,933 A 12/1975 Humphrey
4,370,058 A 1/1983 Trötscher et al.
(Continued)

FOREIGN PATENT DOCUMENTS

DE 10007705 A1 9/2001
EP 0092364 A1 10/1983
(Continued)

OTHER PUBLICATIONS

Simonite, 3-D Models Created by a Cell Phone, Mar. 23, 2011, url: http://www.technologyreview.com/news/423386/3-d-models-created-by-a-cell-phone/.*

(Continued)

*Primary Examiner* — Ming Hon
*Assistant Examiner* — Phuc Doan
(74) *Attorney, Agent, or Firm* — Holland & Hart LLP

(57) ABSTRACT

A computer-implemented method for processing virtual 3-D data efficiently is described. An object image data is generated from a scan of an object. Object polygon model data and object texture map data is generated from the object image data. The object polygon model data is saved in a first object file. The object texture map data is encoded. The encoded object texture map data is saved in a second object file. The data format of the second object file is different than the data format of the first object file.

16 Claims, 8 Drawing Sheets

(51) Int. Cl.
*G06K 9/46* (2006.01)
*G06K 9/00* (2006.01)
*G02C 13/00* (2006.01)

(52) U.S. Cl.
CPC ........... *G06T 19/006* (2013.01); *G02C 13/003* (2013.01); *G06T 2210/16* (2013.01)

(56) References Cited

U.S. PATENT DOCUMENTS

| | | |
|---|---|---|
| 4,467,349 A | 8/1984 | Maloomian |
| 4,522,474 A | 6/1985 | Slavin |
| 4,534,650 A | 8/1985 | Clerget et al. |
| 4,539,585 A | 9/1985 | Spackova et al. |
| 4,573,121 A | 2/1986 | Saigo et al. |
| 4,613,219 A | 9/1986 | Vogel |
| 4,698,564 A | 10/1987 | Slavin |
| 4,724,617 A | 2/1988 | Logan et al. |
| 4,730,260 A | 3/1988 | Mori et al. |
| 4,781,452 A | 11/1988 | Ace |
| 4,786,160 A | 11/1988 | Fürter |
| 4,845,641 A | 7/1989 | Ninomiya et al. |
| 4,852,184 A | 7/1989 | Tamura et al. |
| 4,957,369 A | 9/1990 | Antonsson |
| 5,139,373 A | 8/1992 | Logan et al. |
| 5,255,352 A | 10/1993 | Falk |
| 5,257,198 A | 10/1993 | van Schoyck |
| 5,280,570 A | 1/1994 | Jordan |
| 5,281,957 A | 1/1994 | Schoolman |
| 5,428,448 A | 6/1995 | Albert-Garcia |
| 5,485,399 A | 1/1996 | Saigo et al. |
| 5,550,602 A | 8/1996 | Braeuning |
| 5,592,248 A | 1/1997 | Norton et al. |
| 5,631,718 A | 5/1997 | Markovitz et al. |
| 5,666,957 A | 9/1997 | Juto |
| 5,682,210 A | 10/1997 | Weirich |
| 5,720,649 A | 2/1998 | Gerber et al. |
| 5,724,522 A | 3/1998 | Kagami et al. |
| 5,774,129 A | 6/1998 | Poggio et al. |
| 5,809,580 A | 9/1998 | Arnette |
| 5,844,573 A | 12/1998 | Poggio et al. |
| 5,880,806 A | 3/1999 | Conway |
| 5,908,348 A | 6/1999 | Gottschald |
| 5,974,400 A | 10/1999 | Kagami et al. |
| 5,980,037 A | 11/1999 | Conway |
| 5,983,201 A | 11/1999 | Fay |
| 5,987,702 A | 11/1999 | Simioni |
| 5,988,862 A | 11/1999 | Kacyra et al. |
| D417,883 S | 12/1999 | Arnette |
| 6,016,150 A | 1/2000 | Lengyel et al. |
| 6,018,339 A | 1/2000 | Stevens |
| D420,037 S | 2/2000 | Conway |
| D420,379 S | 2/2000 | Conway |
| D420,380 S | 2/2000 | Simioni et al. |
| 6,024,444 A | 2/2000 | Little |
| D421,764 S | 3/2000 | Arnette |
| D422,011 S | 3/2000 | Conway |
| D422,014 S | 3/2000 | Simioni et al. |
| D423,034 S | 4/2000 | Arnette |
| D423,552 S | 4/2000 | Flanagan et al. |
| D423,553 S | 4/2000 | Brune |
| D423,554 S | 4/2000 | Conway |
| D423,556 S | 4/2000 | Conway |
| D423,557 S | 4/2000 | Conway |
| D424,094 S | 5/2000 | Conway |
| D424,095 S | 5/2000 | Brune et al. |
| D424,096 S | 5/2000 | Conway |
| D424,589 S | 5/2000 | Arnette |
| D424,598 S | 5/2000 | Simioni |
| D425,542 S | 5/2000 | Arnette |
| D425,543 S | 5/2000 | Brune |
| D426,568 S | 6/2000 | Conway |
| D427,225 S | 6/2000 | Arnette |
| D427,227 S | 6/2000 | Conway |
| 6,072,496 A * | 6/2000 | Guenter et al. ............... 345/419 |
| 6,095,650 A | 8/2000 | Gao et al. |
| 6,102,539 A | 8/2000 | Tucker |
| D430,591 S | 9/2000 | Arnette |
| D432,156 S | 10/2000 | Conway et al. |
| D433,052 S | 10/2000 | Flanagan |
| 6,132,044 A | 10/2000 | Sternbergh |
| 6,139,141 A | 10/2000 | Zider |
| 6,139,143 A | 10/2000 | Brune et al. |
| 6,142,628 A | 11/2000 | Saigo |
| 6,144,388 A | 11/2000 | Bornstein |
| D434,788 S | 12/2000 | Conway |
| D439,269 S | 3/2001 | Conway |
| 6,208,347 B1 | 3/2001 | Migdal et al. |
| 6,222,621 B1 | 4/2001 | Taguchi et al. |
| 6,231,188 B1 | 5/2001 | Gao et al. |
| 6,233,049 B1 | 5/2001 | Kondo et al. |
| 6,246,468 B1 | 6/2001 | Dimsdale |
| 6,249,600 B1 | 6/2001 | Reed et al. |
| 6,281,903 B1 | 8/2001 | Martin et al. |
| 6,305,656 B1 | 10/2001 | Wemyss |
| 6,307,568 B1 | 10/2001 | Rom |
| 6,310,627 B1 | 10/2001 | Sakaguchi |
| 6,330,523 B1 | 12/2001 | Kacyra et al. |
| 6,356,271 B1 | 3/2002 | Reiter et al. |
| 6,377,281 B1 | 4/2002 | Rosenbluth et al. |
| 6,386,562 B1 | 5/2002 | Kuo |
| 6,415,051 B1 | 7/2002 | Callari et al. |
| 6,419,549 B2 | 7/2002 | Shirayanagi |
| 6,420,698 B1 | 7/2002 | Dimsdale |
| 6,434,278 B1 | 8/2002 | Hashimoto |
| 6,456,287 B1 | 9/2002 | Kamen et al. |
| 6,466,205 B2 | 10/2002 | Simpson et al. |
| 6,473,079 B1 | 10/2002 | Kacyra et al. |
| 6,492,986 B1 | 12/2002 | Metaxas et al. |
| 6,493,073 B2 | 12/2002 | Epstein |
| 6,508,553 B2 | 1/2003 | Gao et al. |
| 6,512,518 B2 | 1/2003 | Dimsdale |
| 6,512,993 B2 | 1/2003 | Kacyra et al. |
| 6,516,099 B1 | 2/2003 | Davison et al. |
| 6,518,963 B1 | 2/2003 | Waupotitsch et al. |
| 6,527,731 B2 | 3/2003 | Weiss et al. |
| 6,529,192 B1 | 3/2003 | Waupotitsch |
| 6,529,626 B1 | 3/2003 | Watanabe et al. |
| 6,529,627 B1 | 3/2003 | Callari et al. |
| 6,533,418 B1 | 3/2003 | Izumitani et al. |
| 6,535,223 B1 | 3/2003 | Foley |
| 6,556,196 B1 | 4/2003 | Blanz et al. |
| 6,563,499 B1 | 5/2003 | Waupotitsch et al. |
| 6,583,792 B1 | 6/2003 | Agnew |
| 6,624,843 B2 | 9/2003 | Lennon |
| 6,634,754 B2 | 10/2003 | Fukuma et al. |
| 6,637,880 B1 | 10/2003 | Yamakaji et al. |
| 6,647,146 B1 | 11/2003 | Davison et al. |
| 6,650,324 B1 | 11/2003 | Junkins |
| 6,659,609 B2 | 12/2003 | Mothes |
| 6,661,433 B1 | 12/2003 | Lee |
| 6,664,956 B1 | 12/2003 | Erdem |
| 6,668,082 B1 | 12/2003 | Davison et al. |
| 6,671,538 B1 | 12/2003 | Ehnholm et al. |
| 6,677,946 B1 | 1/2004 | Ohba |
| 6,682,195 B2 | 1/2004 | Dreher |
| 6,692,127 B2 | 2/2004 | Abitbol et al. |
| 6,705,718 B2 | 3/2004 | Fossen |
| 6,726,463 B2 | 4/2004 | Foreman |
| 6,734,849 B2 | 5/2004 | Dimsdale et al. |
| 6,736,506 B2 | 5/2004 | Izumitani et al. |
| 6,760,488 B1 | 7/2004 | Moura et al. |
| 6,775,128 B2 | 8/2004 | Leitao |
| 6,785,585 B1 | 8/2004 | Gottschald |
| 6,791,584 B1 | 9/2004 | Xie |
| 6,792,401 B1 | 9/2004 | Nigro et al. |
| 6,807,290 B2 | 10/2004 | Liu et al. |
| 6,808,381 B2 | 10/2004 | Foreman et al. |
| 6,817,713 B2 | 11/2004 | Ueno |
| 6,825,838 B2 | 11/2004 | Smith et al. |
| 6,847,383 B2 | 1/2005 | Agnew |
| 6,847,462 B1 | 1/2005 | Kacyra et al. |
| 6,876,755 B1 | 4/2005 | Taylor et al. |
| 6,893,245 B2 | 5/2005 | Foreman et al. |

(56) References Cited

U.S. PATENT DOCUMENTS

| | | |
|---|---|---|
| 6,903,746 B2 | 6/2005 | Fukushima et al. |
| 6,907,310 B2 | 6/2005 | Gardner et al. |
| 6,922,494 B1 | 7/2005 | Fay |
| 6,943,789 B2 | 9/2005 | Perry et al. |
| 6,944,327 B1 | 9/2005 | Soatto |
| 6,950,804 B2 | 9/2005 | Strietzel |
| 6,961,439 B2 | 11/2005 | Ballas |
| 6,965,385 B2 | 11/2005 | Welk et al. |
| 6,965,846 B2 | 11/2005 | Krimmer |
| 6,968,075 B1 | 11/2005 | Chang |
| 6,980,690 B1 | 12/2005 | Taylor et al. |
| 6,999,073 B1 | 2/2006 | Zwern et al. |
| 7,003,515 B1 | 2/2006 | Glaser et al. |
| 7,016,824 B2 | 3/2006 | Waupotitsch et al. |
| 7,034,818 B2 | 4/2006 | Perry et al. |
| 7,043,059 B2 | 5/2006 | Cheatle et al. |
| 7,051,290 B2 | 5/2006 | Foreman et al. |
| 7,062,722 B1 | 6/2006 | Carlin et al. |
| 7,069,107 B2 | 6/2006 | Ueno |
| 7,095,878 B1 | 8/2006 | Taylor et al. |
| 7,103,211 B1 | 9/2006 | Medioni et al. |
| 7,116,804 B2 | 10/2006 | Murase et al. |
| 7,133,048 B2 | 11/2006 | Brand |
| 7,152,976 B2 | 12/2006 | Fukuma et al. |
| 7,154,529 B2 | 12/2006 | Hoke et al. |
| 7,156,655 B2 | 1/2007 | Sachdeva et al. |
| 7,184,036 B2 | 2/2007 | Dimsdale et al. |
| 7,209,557 B2 | 4/2007 | Lahiri |
| 7,212,656 B2 | 5/2007 | Liu et al. |
| 7,212,664 B2 | 5/2007 | Lee et al. |
| 7,215,430 B2 | 5/2007 | Kacyra et al. |
| 7,218,323 B1 | 5/2007 | Halmshaw et al. |
| 7,219,995 B2 | 5/2007 | Ollendorf et al. |
| 7,224,357 B2 | 5/2007 | Chen et al. |
| 7,234,937 B2 | 6/2007 | Sachdeva et al. |
| 7,242,807 B2 | 7/2007 | Waupotitsch et al. |
| 7,290,201 B1 | 10/2007 | Edwards |
| 7,310,102 B2 | 12/2007 | Spicer |
| 7,324,110 B2 | 1/2008 | Edwards et al. |
| 7,415,152 B2 | 8/2008 | Jiang et al. |
| 7,421,097 B2 | 9/2008 | Hamza et al. |
| 7,426,292 B2 | 9/2008 | Moghaddam et al. |
| 7,434,931 B2 | 10/2008 | Warden et al. |
| 7,436,988 B2 | 10/2008 | Zhang et al. |
| 7,441,895 B2 | 10/2008 | Akiyama et al. |
| 7,450,737 B2 | 11/2008 | Ishikawa et al. |
| 7,489,768 B1 | 2/2009 | Strietzel |
| 7,492,364 B2 | 2/2009 | Devarajan et al. |
| 7,508,977 B2 | 3/2009 | Lyons et al. |
| 7,523,411 B2 | 4/2009 | Carlin |
| 7,530,690 B2 | 5/2009 | Divo et al. |
| 7,532,215 B2 | 5/2009 | Yoda et al. |
| 7,533,453 B2 | 5/2009 | Yancy |
| 7,540,611 B2 | 6/2009 | Welk et al. |
| 7,557,812 B2 | 7/2009 | Chou et al. |
| 7,563,975 B2 | 7/2009 | Leahy et al. |
| 7,573,475 B2 | 8/2009 | Sullivan et al. |
| 7,573,489 B2 | 8/2009 | Davidson et al. |
| 7,587,082 B1 | 9/2009 | Rudin et al. |
| 7,609,859 B2 | 10/2009 | Lee et al. |
| 7,630,580 B1 | 12/2009 | Repenning |
| 7,634,103 B2 | 12/2009 | Rubinstenn et al. |
| 7,643,685 B2 | 1/2010 | Miller |
| 7,646,909 B2 | 1/2010 | Jiang et al. |
| 7,651,221 B2 | 1/2010 | Krengel et al. |
| 7,656,402 B2 | 2/2010 | Abraham et al. |
| 7,657,083 B2 | 2/2010 | Parr et al. |
| 7,663,648 B1 | 2/2010 | Saldanha et al. |
| 7,665,843 B2 | 2/2010 | Xie |
| 7,689,043 B2 | 3/2010 | Austin et al. |
| 7,699,300 B2 | 4/2010 | Iguchi |
| 7,711,155 B1 | 5/2010 | Sharma et al. |
| 7,717,708 B2 | 5/2010 | Sachdeva et al. |
| 7,720,285 B2 | 5/2010 | Ishikawa et al. |
| D616,918 S | 6/2010 | Rohrbach |
| 7,736,147 B2 | 6/2010 | Kaza et al. |
| 7,755,619 B2 | 7/2010 | Wang et al. |
| 7,756,325 B2 | 7/2010 | Vetter et al. |
| 7,760,923 B2 | 7/2010 | Walker et al. |
| 7,768,528 B1 | 8/2010 | Edwards et al. |
| D623,216 S | 9/2010 | Rohrbach |
| 7,804,997 B2 | 9/2010 | Geng et al. |
| 7,814,436 B2 | 10/2010 | Schrag et al. |
| 7,830,384 B1 | 11/2010 | Edwards et al. |
| 7,835,565 B2 | 11/2010 | Cai et al. |
| 7,835,568 B2 | 11/2010 | Park et al. |
| 7,845,797 B2 | 12/2010 | Warden et al. |
| 7,848,548 B1 | 12/2010 | Moon et al. |
| 7,852,995 B2 | 12/2010 | Strietzel |
| 7,856,125 B2 | 12/2010 | Medioni et al. |
| 7,860,225 B2 | 12/2010 | Strietzel |
| 7,860,301 B2 | 12/2010 | Se et al. |
| 7,876,931 B2 | 1/2011 | Geng |
| 7,896,493 B2 | 3/2011 | Welk et al. |
| 7,907,774 B2 | 3/2011 | Parr et al. |
| 7,929,745 B2 | 4/2011 | Walker et al. |
| 7,929,775 B2 | 4/2011 | Hager et al. |
| 7,953,675 B2 | 5/2011 | Medioni et al. |
| 7,961,914 B1 | 6/2011 | Smith |
| 8,009,880 B2 | 8/2011 | Zhang et al. |
| 8,026,916 B2 | 9/2011 | Wen |
| 8,026,917 B1 | 9/2011 | Rogers et al. |
| 8,026,929 B2 | 9/2011 | Naimark |
| 8,031,909 B2 | 10/2011 | Se et al. |
| 8,031,933 B2 | 10/2011 | Se et al. |
| 8,059,917 B2 | 11/2011 | Dumas et al. |
| 8,064,685 B2 | 11/2011 | Solem et al. |
| 8,070,619 B2 | 12/2011 | Edwards |
| 8,073,196 B2 | 12/2011 | Yuan et al. |
| 8,090,160 B2 | 1/2012 | Kakadiaris et al. |
| 8,113,829 B2 | 2/2012 | Sachdeva et al. |
| 8,118,427 B2 | 2/2012 | Bonnin et al. |
| 8,126,242 B2 | 2/2012 | Brett et al. |
| 8,126,249 B2 | 2/2012 | Brett et al. |
| 8,126,261 B2 | 2/2012 | Medioni et al. |
| 8,130,225 B2 | 3/2012 | Sullivan et al. |
| 8,131,063 B2 | 3/2012 | Xiao et al. |
| 8,132,123 B2 | 3/2012 | Schrag et al. |
| 8,144,153 B1 | 3/2012 | Sullivan et al. |
| 8,145,545 B2 | 3/2012 | Rathod et al. |
| 8,155,411 B2 | 4/2012 | Hof et al. |
| 8,160,345 B2 | 4/2012 | Pavlovskaia et al. |
| 8,177,551 B2 | 5/2012 | Sachdeva et al. |
| 8,182,087 B2 | 5/2012 | Esser et al. |
| 8,194,072 B2 | 6/2012 | Jones et al. |
| 8,199,152 B2 | 6/2012 | Sullivan et al. |
| 8,200,502 B2 | 6/2012 | Wedwick |
| 8,204,299 B2 | 6/2012 | Arcas et al. |
| 8,204,301 B2 | 6/2012 | Xiao et al. |
| 8,204,334 B2 | 6/2012 | Bhagavathy et al. |
| 8,208,717 B2 | 6/2012 | Xiao et al. |
| 8,212,812 B2 | 7/2012 | Tsin et al. |
| 8,217,941 B2 | 7/2012 | Park et al. |
| 8,218,836 B2 | 7/2012 | Metaxas et al. |
| 8,224,039 B2 | 7/2012 | Ionita et al. |
| 8,243,065 B2 | 8/2012 | Kim |
| 8,248,417 B1 | 8/2012 | Clifton |
| 8,260,006 B1 | 9/2012 | Callari et al. |
| 8,260,038 B2 | 9/2012 | Xiao et al. |
| 8,260,039 B2 | 9/2012 | Shiell et al. |
| 8,264,504 B2 | 9/2012 | Naimark |
| 8,269,779 B2 | 9/2012 | Rogers et al. |
| 8,274,506 B1 | 9/2012 | Rees |
| 8,284,190 B2 | 10/2012 | Muktinutalapati et al. |
| 8,286,083 B2 | 10/2012 | Barrus et al. |
| 8,289,317 B2 | 10/2012 | Harvill |
| 8,290,769 B2 | 10/2012 | Taub et al. |
| 8,295,589 B2 | 10/2012 | Ofek et al. |
| 8,300,900 B2 | 10/2012 | Lai et al. |
| 8,303,113 B2 | 11/2012 | Esser et al. |
| 8,307,560 B2 | 11/2012 | Tulin |
| 8,330,801 B2 | 12/2012 | Wang et al. |
| 8,346,020 B2 | 1/2013 | Guntur |
| 8,355,079 B2 | 1/2013 | Zhang et al. |

(56) References Cited

U.S. PATENT DOCUMENTS

| | | |
|---|---|---|
| 8,372,319 B2 | 2/2013 | Liguori et al. |
| 8,374,422 B2 | 2/2013 | Roussel |
| 8,385,646 B2 | 2/2013 | Lang et al. |
| 8,391,547 B2 | 3/2013 | Huang et al. |
| 8,459,792 B2 | 6/2013 | Wilson |
| 8,605,942 B2 | 12/2013 | Takeuchi |
| 8,605,989 B2 | 12/2013 | Rudin et al. |
| 8,743,051 B1 | 6/2014 | Moy et al. |
| 8,813,378 B2 | 8/2014 | Grove |
| 2001/0023413 A1 | 9/2001 | Fukuma et al. |
| 2001/0026272 A1 | 10/2001 | Feld et al. |
| 2001/0051517 A1 | 12/2001 | Strietzel |
| 2002/0010655 A1 | 1/2002 | Kjallstrom |
| 2002/0105530 A1 | 8/2002 | Waupotitsch et al. |
| 2002/0149585 A1 | 10/2002 | Kacyra et al. |
| 2003/0001835 A1 | 1/2003 | Dimsdale et al. |
| 2003/0030904 A1 | 2/2003 | Huang |
| 2003/0071810 A1 | 4/2003 | Shoov et al. |
| 2003/0110099 A1 | 6/2003 | Trajkovic et al. |
| 2003/0112240 A1 | 6/2003 | Cerny |
| 2004/0004633 A1 | 1/2004 | Perry et al. |
| 2004/0090438 A1 | 5/2004 | Alliez et al. |
| 2004/0217956 A1 | 11/2004 | Besl et al. |
| 2004/0223631 A1 | 11/2004 | Waupotitsch et al. |
| 2004/0257364 A1 | 12/2004 | Basler |
| 2005/0053275 A1 | 3/2005 | Stokes |
| 2005/0063582 A1 | 3/2005 | Park et al. |
| 2005/0111705 A1 | 5/2005 | Waupotitsch et al. |
| 2005/0128211 A1 | 6/2005 | Berger et al. |
| 2005/0162419 A1* | 7/2005 | Kim et al. ............ 345/419 |
| 2005/0190264 A1 | 9/2005 | Neal |
| 2005/0208457 A1 | 9/2005 | Fink et al. |
| 2005/0226509 A1 | 10/2005 | Maurer et al. |
| 2006/0012748 A1 | 1/2006 | Periasamy et al. |
| 2006/0017887 A1 | 1/2006 | Jacobson et al. |
| 2006/0067573 A1* | 3/2006 | Parr et al. ............ 382/154 |
| 2006/0127852 A1 | 6/2006 | Wen |
| 2006/0161474 A1 | 7/2006 | Diamond et al. |
| 2006/0212150 A1 | 9/2006 | Sims, Jr. |
| 2006/0216680 A1 | 9/2006 | Buckwalter et al. |
| 2007/0013873 A9 | 1/2007 | Jacobson et al. |
| 2007/0104360 A1 | 5/2007 | Huang et al. |
| 2007/0127848 A1 | 6/2007 | Kim et al. |
| 2007/0160306 A1 | 7/2007 | Ahn et al. |
| 2007/0183679 A1 | 8/2007 | Moroto et al. |
| 2007/0233311 A1 | 10/2007 | Okada et al. |
| 2007/0262988 A1 | 11/2007 | Christensen |
| 2008/0084414 A1 | 4/2008 | Rosel et al. |
| 2008/0112610 A1 | 5/2008 | Israelsen et al. |
| 2008/0136814 A1 | 6/2008 | Chu et al. |
| 2008/0152200 A1 | 6/2008 | Medioni et al. |
| 2008/0162695 A1 | 7/2008 | Muhn et al. |
| 2008/0163344 A1 | 7/2008 | Yang |
| 2008/0170077 A1 | 7/2008 | Sullivan et al. |
| 2008/0201641 A1 | 8/2008 | Xie |
| 2008/0219589 A1* | 9/2008 | Jung et al. ............ 382/276 |
| 2008/0240588 A1 | 10/2008 | Tsoupko-Sitnikov et al. |
| 2008/0246759 A1 | 10/2008 | Summers |
| 2008/0271078 A1 | 10/2008 | Gossweiler et al. |
| 2008/0278437 A1 | 11/2008 | Barrus et al. |
| 2008/0278633 A1 | 11/2008 | Tsoupko-Sitnikov et al. |
| 2008/0279478 A1 | 11/2008 | Tsoupko-Sitnikov et al. |
| 2008/0280247 A1 | 11/2008 | Sachdeva et al. |
| 2008/0294393 A1 | 11/2008 | Laake et al. |
| 2008/0297503 A1 | 12/2008 | Dickinson et al. |
| 2008/0310757 A1 | 12/2008 | Wolberg et al. |
| 2009/0010507 A1 | 1/2009 | Geng |
| 2009/0040216 A1* | 2/2009 | Ishiyama ............ 345/419 |
| 2009/0123037 A1 | 5/2009 | Ishida |
| 2009/0129402 A1 | 5/2009 | Moller et al. |
| 2009/0132371 A1 | 5/2009 | Strietzel et al. |
| 2009/0135176 A1 | 5/2009 | Snoddy et al. |
| 2009/0135177 A1 | 5/2009 | Strietzel et al. |
| 2009/0144173 A1 | 6/2009 | Mo et al. |
| 2009/0153552 A1 | 6/2009 | Fidaleo et al. |
| 2009/0153553 A1 | 6/2009 | Kim et al. |
| 2009/0153569 A1 | 6/2009 | Park et al. |
| 2009/0154794 A1 | 6/2009 | Kim et al. |
| 2009/0184960 A1 | 7/2009 | Carr et al. |
| 2009/0185763 A1 | 7/2009 | Park et al. |
| 2009/0219281 A1 | 9/2009 | Maillot |
| 2009/0279784 A1 | 11/2009 | Arcas et al. |
| 2009/0296984 A1 | 12/2009 | Nijim et al. |
| 2009/0304270 A1 | 12/2009 | Bhagavathy et al. |
| 2009/0310861 A1 | 12/2009 | Lang et al. |
| 2009/0316945 A1 | 12/2009 | Akansu |
| 2009/0316966 A1 | 12/2009 | Marshall et al. |
| 2009/0324030 A1 | 12/2009 | Frinking et al. |
| 2009/0324121 A1 | 12/2009 | Bhagavathy et al. |
| 2010/0030578 A1 | 2/2010 | Siddique et al. |
| 2010/0134487 A1 | 6/2010 | Lai et al. |
| 2010/0138025 A1 | 6/2010 | Morton et al. |
| 2010/0141893 A1 | 6/2010 | Altheimer et al. |
| 2010/0145489 A1 | 6/2010 | Esser et al. |
| 2010/0166978 A1 | 7/2010 | Nieminen |
| 2010/0179789 A1 | 7/2010 | Sachdeva et al. |
| 2010/0191504 A1 | 7/2010 | Esser et al. |
| 2010/0198817 A1 | 8/2010 | Esser et al. |
| 2010/0209005 A1 | 8/2010 | Rudin et al. |
| 2010/0277476 A1 | 11/2010 | Johansson et al. |
| 2010/0293192 A1 | 11/2010 | Suy et al. |
| 2010/0293251 A1 | 11/2010 | Suy et al. |
| 2010/0302275 A1 | 12/2010 | Saldanha et al. |
| 2010/0329568 A1 | 12/2010 | Gamliel et al. |
| 2011/0001791 A1 | 1/2011 | Kirshenboim et al. |
| 2011/0025827 A1 | 2/2011 | Shpunt et al. |
| 2011/0026606 A1 | 2/2011 | Bhagavathy et al. |
| 2011/0026607 A1 | 2/2011 | Bhagavathy et al. |
| 2011/0029561 A1 | 2/2011 | Slaney et al. |
| 2011/0040539 A1 | 2/2011 | Szymczyk et al. |
| 2011/0043540 A1 | 2/2011 | Fancher et al. |
| 2011/0043610 A1 | 2/2011 | Ren et al. |
| 2011/0071804 A1 | 3/2011 | Xie |
| 2011/0075916 A1 | 3/2011 | Knothe et al. |
| 2011/0096832 A1 | 4/2011 | Zhang et al. |
| 2011/0102553 A1 | 5/2011 | Corcoran et al. |
| 2011/0115786 A1 | 5/2011 | Mochizuki |
| 2011/0148858 A1 | 6/2011 | Ni et al. |
| 2011/0157229 A1 | 6/2011 | Ni et al. |
| 2011/0158394 A1 | 6/2011 | Strietzel |
| 2011/0166834 A1 | 7/2011 | Clara |
| 2011/0188780 A1 | 8/2011 | Wang et al. |
| 2011/0208493 A1 | 8/2011 | Altheimer et al. |
| 2011/0211816 A1 | 9/2011 | Goedeken et al. |
| 2011/0227923 A1 | 9/2011 | Mariani et al. |
| 2011/0227934 A1 | 9/2011 | Sharp |
| 2011/0229659 A1 | 9/2011 | Reynolds |
| 2011/0229660 A1 | 9/2011 | Reynolds |
| 2011/0234581 A1 | 9/2011 | Eikelis et al. |
| 2011/0234591 A1 | 9/2011 | Mishra et al. |
| 2011/0249136 A1 | 10/2011 | Levy |
| 2011/0262717 A1 | 10/2011 | Broen et al. |
| 2011/0279634 A1 | 11/2011 | Periyannan et al. |
| 2011/0292034 A1 | 12/2011 | Corazza et al. |
| 2011/0293247 A1 | 12/2011 | Bhagavathy et al. |
| 2011/0304912 A1 | 12/2011 | Broen et al. |
| 2011/0306417 A1 | 12/2011 | Sheblak et al. |
| 2012/0002161 A1 | 1/2012 | Altheimer et al. |
| 2012/0008090 A1 | 1/2012 | Atheimer et al. |
| 2012/0013608 A1 | 1/2012 | Ahn et al. |
| 2012/0016645 A1 | 1/2012 | Altheimer et al. |
| 2012/0021835 A1 | 1/2012 | Keller et al. |
| 2012/0038665 A1 | 2/2012 | Strietzel |
| 2012/0075296 A1 | 3/2012 | Wegbreit et al. |
| 2012/0079377 A1 | 3/2012 | Goossens |
| 2012/0082432 A1 | 4/2012 | Ackley et al. |
| 2012/0114184 A1 | 5/2012 | Barcons-Palau et al. |
| 2012/0114251 A1 | 5/2012 | Solem et al. |
| 2012/0121174 A1 | 5/2012 | Bhagavathy et al. |
| 2012/0130524 A1 | 5/2012 | Clara et al. |
| 2012/0133640 A1 | 5/2012 | Chin et al. |
| 2012/0133850 A1 | 5/2012 | Broen et al. |
| 2012/0147324 A1 | 6/2012 | Marin et al. |
| 2012/0158369 A1 | 6/2012 | Bachrach et al. |

(56) References Cited

U.S. PATENT DOCUMENTS

| | | | |
|---|---|---|---|
| 2012/0162218 A1 | 6/2012 | Kim et al. | |
| 2012/0166431 A1 | 6/2012 | Brewington et al. | |
| 2012/0170821 A1 | 7/2012 | Zug et al. | |
| 2012/0176380 A1 | 7/2012 | Wang et al. | |
| 2012/0177283 A1 | 7/2012 | Wang et al. | |
| 2012/0183202 A1 | 7/2012 | Wei et al. | |
| 2012/0183204 A1 | 7/2012 | Aarts et al. | |
| 2012/0183238 A1 | 7/2012 | Savvides et al. | |
| 2012/0192401 A1 | 8/2012 | Pavlovskaia et al. | |
| 2012/0206610 A1 | 8/2012 | Wang et al. | |
| 2012/0219195 A1 | 8/2012 | Wu et al. | |
| 2012/0224629 A1 | 9/2012 | Bhagavathy et al. | |
| 2012/0229758 A1 | 9/2012 | Marin et al. | |
| 2012/0256906 A1 | 10/2012 | Ross et al. | |
| 2012/0263437 A1 | 10/2012 | Barcons-Palau et al. | |
| 2012/0288015 A1 | 11/2012 | Zhang et al. | |
| 2012/0294369 A1 | 11/2012 | Bhagavathy et al. | |
| 2012/0294530 A1 | 11/2012 | Bhaskaranand | |
| 2012/0299914 A1 | 11/2012 | Kilpatrick et al. | |
| 2012/0306874 A1 | 12/2012 | Nguyen et al. | |
| 2012/0307074 A1 | 12/2012 | Bhagavathy et al. | |
| 2012/0314023 A1 | 12/2012 | Barcons-Palau et al. | |
| 2012/0320153 A1 | 12/2012 | Barcons-Palau et al. | |
| 2012/0321128 A1 | 12/2012 | Medioni et al. | |
| 2012/0323581 A1 | 12/2012 | Strietzel et al. | |
| 2013/0027657 A1 | 1/2013 | Esser et al. | |
| 2013/0070973 A1 | 3/2013 | Saito et al. | |
| 2013/0088490 A1 | 4/2013 | Rasmussen et al. | |
| 2013/0187915 A1* | 7/2013 | Lee et al. | 345/420 |
| 2013/0201187 A1 | 8/2013 | Tong et al. | |
| 2013/0271451 A1* | 10/2013 | Tong et al. | 345/419 |

FOREIGN PATENT DOCUMENTS

| | | |
|---|---|---|
| EP | 0359596 A1 | 3/1990 |
| EP | 0994336 A2 | 4/2000 |
| EP | 1011006 A1 | 6/2000 |
| EP | 1136869 A1 | 9/2001 |
| EP | 1138253 A2 | 10/2001 |
| EP | 0444902 B2 | 6/2002 |
| EP | 1450201 A1 | 8/2004 |
| EP | 1728467 A1 | 12/2006 |
| EP | 1154302 B1 | 8/2009 |
| FR | 2966038 A1 | 4/2012 |
| GB | 2449855 A | 12/2008 |
| JP | 2003345857 A | 12/2003 |
| JP | 2004272530 A | 9/2004 |
| JP | 2005269022 A | 9/2005 |
| KR | 20000028583 A | 5/2000 |
| KR | 200000051217 A | 8/2000 |
| KR | 20040097200 A | 11/2004 |
| KR | 20080086945 A | 9/2008 |
| KR | 20100050052 A | 5/2010 |
| WO | WO 9300641 A1 | 1/1993 |
| WO | WO 9604596 A1 | 2/1996 |
| WO | WO 9740342 A2 | 10/1997 |
| WO | WO 9740960 A1 | 11/1997 |
| WO | WO 9813721 A1 | 4/1998 |
| WO | WO 9827861 A1 | 7/1998 |
| WO | WO 9827902 A2 | 7/1998 |
| WO | WO 9835263 A1 | 8/1998 |
| WO | WO 9852189 A2 | 11/1998 |
| WO | WO 9857270 A1 | 12/1998 |
| WO | WO 9956942 A1 | 11/1999 |
| WO | WO 9964918 A1 | 12/1999 |
| WO | WO 0000863 A1 | 1/2000 |
| WO | WO 0016683 A1 | 3/2000 |
| WO | WO 0045348 A1 | 8/2000 |
| WO | WO 0049919 A1 | 8/2000 |
| WO | WO 0062148 A1 | 10/2000 |
| WO | WO 0064168 A1 | 10/2000 |
| WO | WO 0123908 A1 | 4/2001 |
| WO | WO 0132074 A1 | 5/2001 |
| WO | WO 0135338 A1 | 5/2001 |
| WO | WO 0161447 A1 | 8/2001 |
| WO | WO 0167325 A1 | 9/2001 |
| WO | WO 0174553 A2 | 10/2001 |
| WO | WO 0178630 A1 | 10/2001 |
| WO | WO 0188654 A2 | 11/2001 |
| WO | WO 0207845 A1 | 1/2002 |
| WO | WO 0241127 A2 | 5/2002 |
| WO | WO 03079097 A1 | 9/2003 |
| WO | WO 03084448 A1 | 10/2003 |
| WO | WO 2007012261 A1 | 2/2007 |
| WO | WO 2007017751 A1 | 2/2007 |
| WO | WO 2007018017 A1 | 2/2007 |
| WO | WO 2008009355 A1 | 1/2008 |
| WO | WO 2008009423 A1 | 1/2008 |
| WO | WO 2008135178 A1 | 11/2008 |
| WO | WO 2009023012 A1 | 2/2009 |
| WO | WO 2009043941 A1 | 4/2009 |
| WO | 2010039976 A1 | 4/2010 |
| WO | 2010042990 A1 | 4/2010 |
| WO | WO 2011012743 A2 | 2/2011 |
| WO | WO 2011095917 A1 | 8/2011 |
| WO | WO 2011134611 A1 | 11/2011 |
| WO | WO 2011147649 A1 | 12/2011 |
| WO | WO 2012051654 A1 | 4/2012 |
| WO | WO 2012054972 A1 | 5/2012 |
| WO | WO 2012054983 A1 | 5/2012 |

OTHER PUBLICATIONS

PCT International Search Report for PCT International Patent Application No. PCT/US2013/042512, mailed Sep. 6, 2013.
PCT International Search Report for PCT International Patent Application No. PCT/US2013/042529, mailed Sep. 17, 2013.
PCT International Search Report for PCT International Patent Application No. PCT/US2013/042525, mailed Sep. 17, 2013.
PCT International Search Report for PCT International Patent Application No. PCT/US2013/042520, mailed Sep. 27, 2013.
Tracker, Tracker Help, Nov. 2009.
PCT International Search Report for PCT International Patent Application No. PCT/US2012/068174, mailed Mar. 7, 2013.
3D Morphable Model Face Animation, http://www.youtube.com/watch?v=nice6NYb_WA, Apr. 20, 2006.
Visionix 3D iView, Human Body Measurement Newsletter, vol. 1., No. 2, Sep. 2005, pp. 2 and 3.
Blaise Aguera y Areas demos Photosynth, May 2007. Ted.com, http://www.ted.com/talks/blaise_aguera_y_arcas_demos_photosynth.html.
ERC Tecnology Leads to Eyeglass "Virtual Try-on" System, Apr. 20, 2012, http://showcase.erc-assoc.org/accomplishments/microelectronic/imsc6-eyeglass.htm.
Information about Related Patents and Patent Applications, see the section below having the same title.
U.S. Appl. No. 13/775,785, filed Feb. 25, 2013, Systems and Methods for Adjusting a Virtual Try-On.
U.S. Appl. No. 13/775,764, filed Feb. 25, 2013, Systems and Methods for Feature Tracking.
U.S. Appl. No. 13/774,995, filed Feb. 22, 2013, Systems and Methods for Scaling a Three-Dimensional Model.
U.S. Appl. No. 13/774,985, filed Feb. 22, 2013, Systems and Methods for Generating a 3-D Model of a Virtual Try-On Product.
U.S. Appl. No. 13/774,983, filed Feb. 22, 2013, Systems and Methods for Generating a 3-D Model of a User for a Virtual Try-On Product.
U.S. Appl. No. 13/774,978, filed Feb. 22, 2013, Systems and Methods for Efficiently Processing Virtual 3-D Data.
U.S. Appl. No. 13/774,958, filed Feb. 22, 2013, Systems and Methods for Rendering Virtual Try-On Products.
U.S. Appl. No. 13/706,909, filed Dec. 6, 2012, Systems and Methods for Obtaining a Pupillary Distance Measurement Using a Mobile Computing Device.
PCT International Search Report for PCT International Patent Application No. PCT/US2013/042504, mailed Aug. 19, 2013.
PCT International Search Report for PCT International Patent Application No. PCT/US2013/042509, mailed Sep. 2, 2013.
PCT International Search Report for PCT International Patent Application No. PCT/US2013/042514, mailed Aug. 30, 2013.
PCT International Search Report for PCT International Patent Application No. PCT/US2013/042517, mailed Aug. 29, 2013.
Dror et al., Recognition of Surface Relfectance Properties form a Single Image under Unknown Real-World Illumination, IEEE, Pro-

(56) References Cited

OTHER PUBLICATIONS ceedings of the IEEE Workshop on Identifying Objects Across Variations in Lighting: Psychophysics & Computation, Dec. 2011.
Sinha et al., GPU-based Video Feautre Tracking and Matching, http::frahm.web.unc.edu/files/2014/01/GPU-based-Video-Feature-Tracking-And Matching.pdf, May 2006.

Fidaleo, Model-Assisted 3D Face Reconstruction from Video, AMFG'07 Analysis and Modeling of Faces and Gestures Lecture Notes in Computer Science vol. 4778, 2007, pp. 124-138.
Garcia-Mateos, Estimating 3D facial pose in video with just three points, CVPRW'08 Computer vision and Pattern Recognition Workshops, 2008.

* cited by examiner

SYSTEMS AND METHODS FOR EFFICIENTLY PROCESSING VIRTUAL 3-D DATA

RELATED APPLICATIONS

This application claims priority to U.S. Provisional Application No. 61/650,983, entitled SYSTEMS AND METHODS TO VIRTUALLY TRY-ON PRODUCTS, filed on May 23, 2012; and U.S. Provisional Application No. 61/735,951, entitled SYSTEMS AND METHODS TO VIRTUALLY TRY-ON PRODUCTS, filed on Dec. 11, 2012, which is incorporated herein in its entirety by this reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. For example, computers have opened up an entire industry of internet shopping. In many ways, online shopping has changed the way consumers purchase products. For example, a consumer may want to know what they will look like in and/or with a product on the screen of their computer in a virtual sense. A virtual three-dimensional (3-D) scene may be rendered to improve the online shopping experience. Rendering a 3-D scene may involve processing relatively large amounts of data and computationally complex algorithms. Thus, current systems may introduce considerable delays processing a virtual 3-D scene.

SUMMARY

According to at least one embodiment, a computer-implemented method for processing virtual 3-D data efficiently is described. An object image data may be generated from a scan of an object. Object polygon model data and object texture map data may be generated from the object image data. The object polygon model data may be saved in a first object file. The object texture map data may be encoded. The encoded object texture map data may be saved in a second object file. The data format of the second object file may be different than the data format of the first object file.

In one embodiment, user image data may be generated from a scan of at least a portion of a user. A black and white version of the user image data may be created. The user image data may be encoded and the encoded user image data may be saved in a third file. An image of the black and white version of the user image data may be processed. A timestamp of the processed image of the black and white version of the user image data may be compared to a timestamp of an image from the encoded user image data. A result of processing the image of the black and white version of the user image data may be merged with a corresponding image of the encoded user image data. The merged user image data may be encoded and saved in a user data file. The encoded user data file may be transferred from a first computing device to a second computing device. User polygon model data may be calculated from the encoded user data file. A plurality of coefficients are generated from the calculated user polygon model data. In some embodiments, the coefficients are generated on the first computing device. The generated plurality of coefficients are transferred from the second computing device to the first computing device. On the first computing device, a morphable model of the user may be generated from the plurality of coefficients. The morphable model may be generated using a plurality of 3-D models. Vertices of the plurality of 3-D models may be saved as half-floats in a plurality of vertex files. A predetermined order of the vertices of the plurality of 3-D models may be saved as half-floats in a single vertex order file. In some embodiments, the first object file includes a binary-encoded file. The second object file and the encoded user data file include compressed video files.

A computing device configured to process virtual 3-D data efficiently is also described. The device may include a processor and memory in electronic communication with the processor. The memory may store instructions that are executable by the processor to generate object image data from a scan of an object, generate object polygon model data and object texture map data from the object image data, and save the object polygon model data in a first object file. Additionally, the instructions may be executable by the processor to encode the object texture map data and save the encoded object texture map data in a second object file with a data format different than the data format of the first object file.

A computer-program product to process virtual 3-D data efficiently is also described. The computer-program product may include a non-transitory computer-readable medium that stores instructions. The instructions may be executable by a processor to generate object image data from a scan of an object, generate object polygon model data and object texture map data from the object image data, and save the object polygon model data in a first object file. Additionally, the instructions may be executable by the processor to encode the object texture map data and save the encoded object texture map data in a second object file with a data format different than the data format of the first object file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
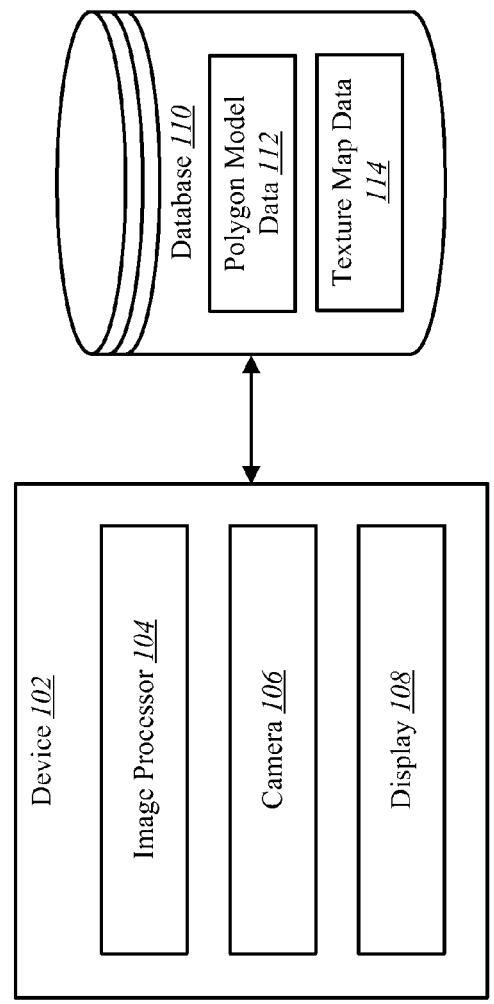
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to the virtually tying-on of products. Three-dimensional (3-D) computer graphics are graphics that use a 3-D representation of geometric data that is stored in the computer for the purposes of performing calculations and rendering 2-D images. Such images may be stored for viewing later or displayed in real-time. A 3-D space may include a mathematical representation of a 3-D surface of an object. A 3-D model may be contained within a graphical data file. A 3-D model may represent a 3-D object using a collection of points in 3-D space, connected by various geometric entities such as triangles, lines, curved surfaces, etc. Being a collection of data (points and other information), 3-D models may be created by hand, algorithmically (procedural modeling), or scanned such as with a laser scanner. A 3-D model may be displayed visually as a two-dimensional image through a process called 3-D rendering, or used in non-graphical computer simulations and calculations. In some cases, the 3-D model may be physically created using a 3-D printing device.

A virtual 3-D space may include a depiction of 3-D objects. For example, the virtual 3-D space may include a 3-D model of a user's face and a polygon mesh of a pair of glasses. The 3-D polygon mesh of the pair of glasses may be placed on the user to create a 3-D virtual depiction of the user wearing a properly scaled pair of glasses. Rendering a viewpoint of the 3-D scene may include processing, storing, and transferring over one or more networks relatively large amounts of data. The present system describes one or more embodiments of efficiently processing, storing, and transferring virtual 3-D data. Although many of the examples used herein describe the virtual try-on of glasses, it is understood that the systems and methods described herein may be used to virtually try-on a wide variety of products. Examples of such products may include glasses, clothing, footwear, jewelry, accessories, hair styles, etc.

FIG. 1 is a block diagram illustrating one embodiment of an environment 100 in which the present systems and methods may be implemented. In some embodiments, the systems and methods described herein may be performed on a single device (e.g., device 102). For example, an image processor 104 may be located on the device 102. Examples of devices 102 include mobile devices, smart phones, personal computing devices, computers, servers, etc.

In some configurations, a device 102 may include an image processor 104, a camera 106, and a display 108. In one example, the device 102 may be coupled to a database 110. In one embodiment, the database 110 may be internal to the device 102. In another embodiment, the database 110 may be external to the device 102. In some configurations, the database 110 may include polygon model data 112 and texture map data 114.

In one embodiment, the image processor 104 may enable an efficient processing of virtual 3-D data to allow a user to virtually try-on a pair of glasses in a timely and data-efficient manner. In some configurations, the image processor 104 may obtain multiple images of a user. For example, the image processor 104 may capture multiple images of a user via the camera 106. For instance, the image processor 104 may capture a video (e.g., a 5 second video) via the camera 106. In some configurations, the image processor 104 may generate polygon model data 112 and texture map data 114 to generate a 3-D representation of a user. For example, the polygon model data 112 may include vertex coordinates of a polygon model of the user's head. In some embodiments, the image processor 104 may use color information from the pixels of multiple images of the user to create a texture map of the user. In some configurations, the image processor 104 may generate and/or obtain a 3-D representation of a product. For example, the polygon model data 112 and texture map data 114 may include a 3-D model of a pair of glasses. In some embodiments, the polygon model data 112 may include a polygon model of an object. In some configurations, the texture map data 114 may define a visual aspect (e.g., pixel information) of the 3-D model of the object such as color, texture, shadow, or transparency.

In some configurations, the image processor 104 may generate a virtual try-on image by efficiently processing, storing, and transferring at least a portion of a virtual 3-D space that contains a 3-D model of a user and a 3-D model of a product. In some configurations, the image processor 104 may output the virtual try-on image to the display 108 to be displayed to the user. In some embodiments, the image processor 104 may store the polygon model data 112 in a first object file and store the texture map data 114 in a second object file. In some configurations, the data format of the second object file may be different than the data format of the first object file. For example, the first object file may include a binary-encoded file format, and the second object file may include a compressed video file format.

Figure 2:
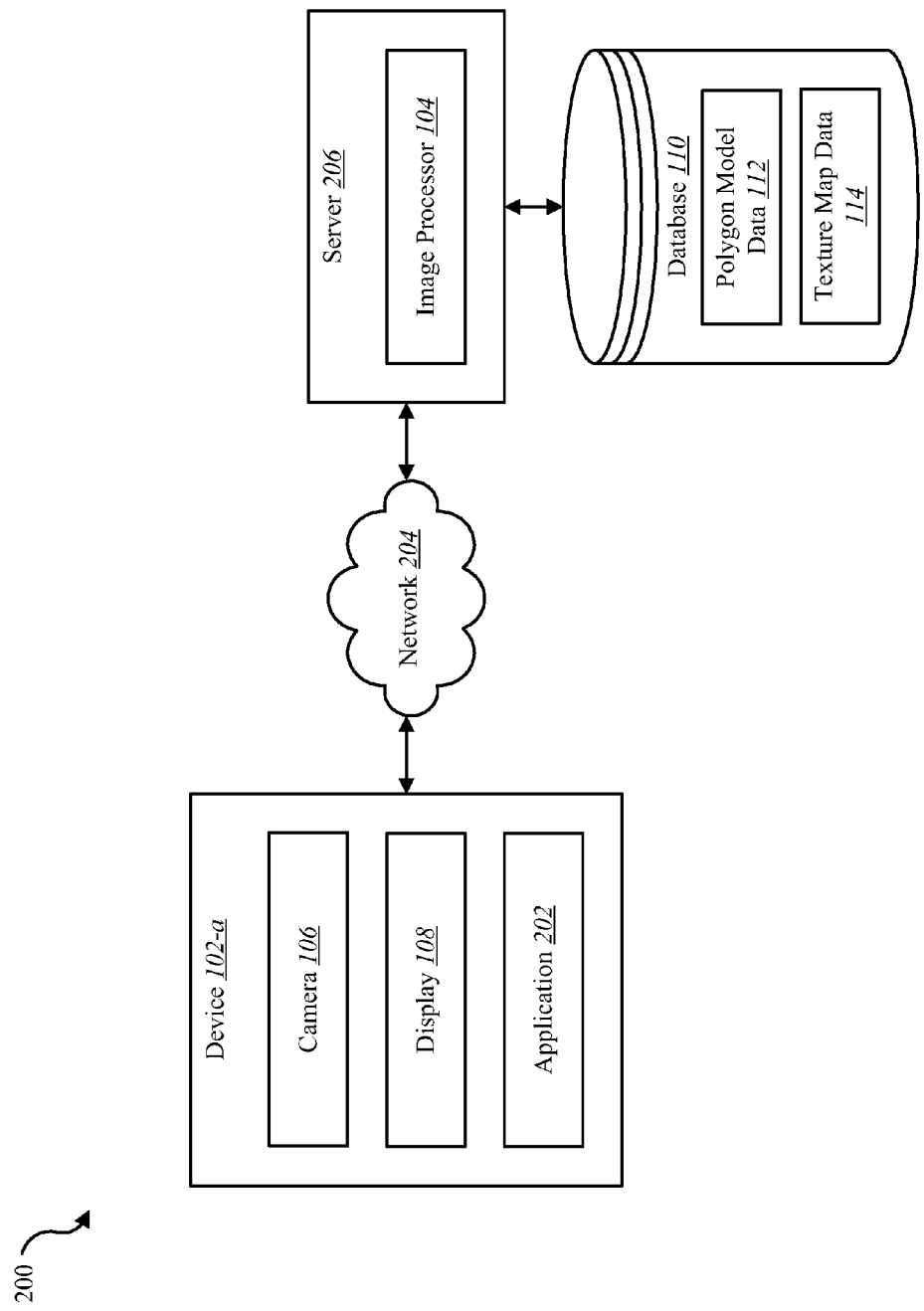
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 102-a may communicate with a server 206 via a network 204. Examples of networks 204 include, local area networks (LAN), wide area networks (WAN), virtual private networks (VPN), wireless networks (using 802.11, for example), cellular networks (using 3G and/or LTE, for example), etc. In some configurations, the network 204 may include the internet. In some configurations, the device 102-a may be one example of the device 102 illustrated in FIG. 1. For example, the device 102-a may include the camera 106, the display 108, and an application 202. It is noted that in some embodiments, the device 102-a may not include an image processor 104. In some embodiments, both a device 102-a and a server 206 may include an image processor 104 where at least a portion of the functions of the image processor 104 are performed separately and/or concurrently on both a device 102-a and a server 206.

In some embodiments, the server 206 may include the image processor 104 and may be coupled to the database 110. For example, the image processor 104 may access the polygon model data 112 and the texture map data 114 in the database 110 via the server 206. The database 110 may be internal or external to the server 206.

In some configurations, the application 202 may capture multiple images via the camera 106. For example, the application 202 may use the camera 106 to capture a video. Upon capturing the multiple images, the application 202 may process the multiple images to generate result data. In some embodiments, the application 202 may transmit the multiple images to the server 206. Additionally, or alternatively, the application 202 may transmit to the server 206 the result data or at least one file associated with the result data.

In some configurations, the image processor 104 may efficiently process multiple images of a user to generate a 3-D model of the user. In some configurations, the image processor 104 may process a scan of an object to create a 3-D polygon model of the object. The image processor 104 may render a 3-D space that includes the 3-D model of the user and the 3-D polygon model of the object to render a virtual try-on 2-D image of the object and the user. The application 202 may output the rendered virtual try-on image to the display 208 to be displayed to the user.

Figure 3:
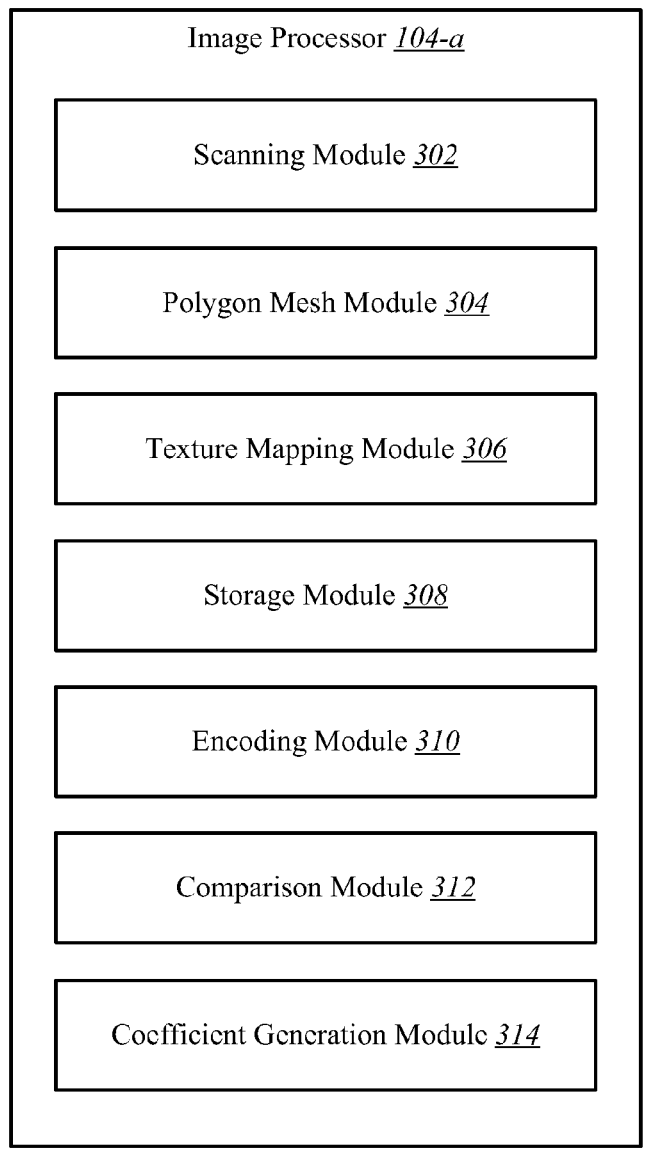
FIG. 3 is a block diagram illustrating one example of an image processor.

FIG. 3 is a block diagram illustrating one example of an image processor 104-a. As depicted, the image processor 104-a may include a scanning module 302, a polygon mesh module 304, a texture mapping module 306, a storage module 308, an encoding module 310, a comparison module 312, and a coefficient generation module 314.

In one embodiment, the scanning module 302 may generate object image data from a scan of an object. For example, a pair of glasses may be scanned. The scanning module 302 may generate object image data from the scan of a pair of glasses. Additionally, or alternatively, the scanning module 302 may generate user image data from a scan of at least a portion of a user. The polygon mesh module 304 may generate object polygon model data from the object image data. For example, the polygon mesh module 304 may generate multiple vertices of polygons to define the surface structure of a scanned object in a virtual 3-D space. The texture mapping module 306 may generate object texture map data from the object image data. For example, the texture mapping module 306 may generate a shadow texture map, a transparency texture map, and/or a color texture map of a scanned object.

In one embodiment, the storage module 308 may save the object polygon model data in a first object file and save the object texture map data in a second object file. The data format of the second file format may be different than the data format of the first object file. For example, the storage module 308 may store the object polygon model data in polygon model data 112 and the object texture map in texture map data 114 in database 110. In some configurations, the storage module 308 may save the object polygon model data in a binary-encoded file format and save the object texture map in a compressed video file format.

In one embodiment, the encoding module 310 may encode the object texture map data. For example, the encoding module 310 may use a codec to encode the object texture map data. Examples of codecs include MPEG-1, MPEG-2, MPEG-4, H.264, AVI, and the like. Encoding data using a codec may include data compression. In some configurations, the encoding module 310 may encode the user image data. The storage module 308 may save the encoded object texture map data in the second file. The storage module 308 may save the encoded user image data in a third file. Thus, in some embodiments, the storage module 308 may save the object polygon model data in a first file, the encoded object texture map data in a second file, and the encoded user image data in a third file. For example, in a first scan, the scanning module 302 may capture a scan of a pair of glasses. From the scanned pair of glasses, the polygon mesh module 304 may generate object polygon model data and the texture mapping module 306 may generate object texture map data. The encoding module 310 may encode the object texture map data of the scanned pair of glasses using a video codec. The storage module 308 may store the encoded object texture map data in the texture map data 114 in the database 110. The storage module 308 may store the object polygon model data in the polygon model data 112 in the database 110. In a second scan, the scanning module 302 may capture a scan of a user's face. The scan of the user's face may include multiple reference viewpoints of the user's face. For instance, the scan of the user's face may include a panning of the user's face from ear to ear. As described above, the encoding module 310 may encode the image data from the scan of the user to efficiently process the user image data.

In some embodiments, the image processor 104-a may create a black and white version of the user image data. For example, the scanning module 302 may capture user image data from a scan of the user in full color. To process the image data from the scan of the user more efficiently and in a more timely fashion, the image processor 104-a may create a black and white version of the full-color user image data. The encoding module 310 may encode the color version of the scan of the user. In some configurations, the image processor 104-a may process an image of the black and white version of the user image data. For example, the image processor 104-a may calculate the camera viewing angle from each captured image of the user. Upon processing a black and white version of an image from the user image data, the comparison module 312 may compare a timestamp of the processed image of the black and white version of the user image data to a timestamp of an image from the encoded full-color user image data. Upon determining a match between the black and white image and full-color image, the image processor 104-a may merge a result of processing the image of the black and white version of the user image data with a corresponding image of the full-color user image data. In some configurations, the encoding module 310 may encode the merged user image data using a video codec. The storage module 308 may store the encoded merged user image data into a user data file in a compressed video file format. Encoding the user data file in a compressed video file format may allow the user data file to be transferred over a computer network (e.g., network 204) more efficiently than transferring the original, un-encoded data from the scan of the user. The storage module 308 may store the user image data in the database 110. Thus, the image processor 104-a may efficiently process the scan of the user in black and white and incorporate the result of processing the black and white version of the scan of the user with the full-color version of the scan of the user, thus saving computing resources and reducing the time a user waits before being able to view a rendered 3-D scene (e.g., a virtual depiction of the user wearing a virtual pair of glasses) on the display 108 of the device 102.

In some embodiments, the polygon mesh module 304 may calculate user polygon model data from the scan of a user. As described above, the results of the scan of the user may be encoded by the encoding module 310. The encoding module 310 may use a codec to encode the user image data. In some embodiments, the image processor 104-a may transmit the encoded user data file to a server 206. The server 206 may process the encoded user data file. Additionally, or alternatively, the user data file may be processed on the device 102. In some embodiments, the polygon mesh module 304 may calculate user polygon model data from the encoded user data file. In one embodiment, the coefficient generation module 314 may generate a plurality of coefficients from the calculated user polygon model data. For example, the database 110 may include a morphable model to depict a user's head in a 3-D space. The morphable model may be configured to morph into the calculated shape of the user's head determined from the scan of the user. In some embodiments, the shape of the morphable model may be determined from the linear combination of a predetermined number of coefficients.

Thus, instead of transferring the entire set of calculated user polygon model data from the server 206 to the device 102-*a*, in some configurations, the server 206 sends a predetermined number of coefficients to the device 102-*a*. The device 102-*a*, via the polygon mesh module 304, may generate a polygon model of the user's head from the predetermined number of coefficients sent from the server 206, thus conserving computing resources, limiting computing overhead, and reducing network traffic.

In some configurations, the storage module 308 may save vertices of a plurality of 3-D models (e.g., the morphable model) as half-floats in a plurality of vertex files. The storage module may save a predetermined order of the vertices of the plurality of 3-D models as half-floats in a single vertex order file.

Figure 4:
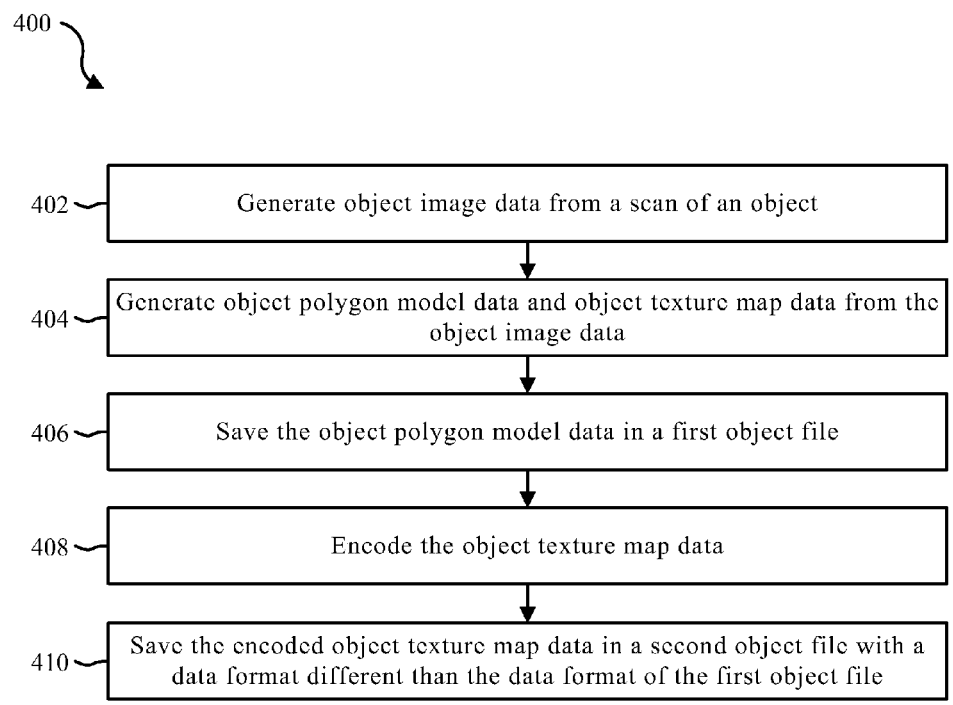
FIG. 4 is a flow diagram illustrating one embodiment of a method to process virtual 3-D data efficiently.

FIG. 4 is a flow diagram illustrating one embodiment of a method to process virtual 3-D data efficiently. In some configurations, the method 400 may be implemented by the image processor 104 illustrated in FIGS. 1, 2, and/or 3. In some configurations, the method 400 may be implemented by the application 202 illustrated in FIG. 2.

At block 402, an object image data may be generated from a scan of an object. At block 404, object polygon model data and object texture map data may be generated from the object image data. For example, polygon model data and texture map data may be generated from a scanned pair of glasses.

At block 406, the object polygon model data may be stored in a first object file. At block 408, the object texture map data may be encoded. At block 410, the encoded object texture map data may be stored in a second object file with a data format different than the data format of the first object file. In some embodiments, the first object file is saved in a binary-encoded file format and the second object file is saved in a compressed video file format.

Figure 5:
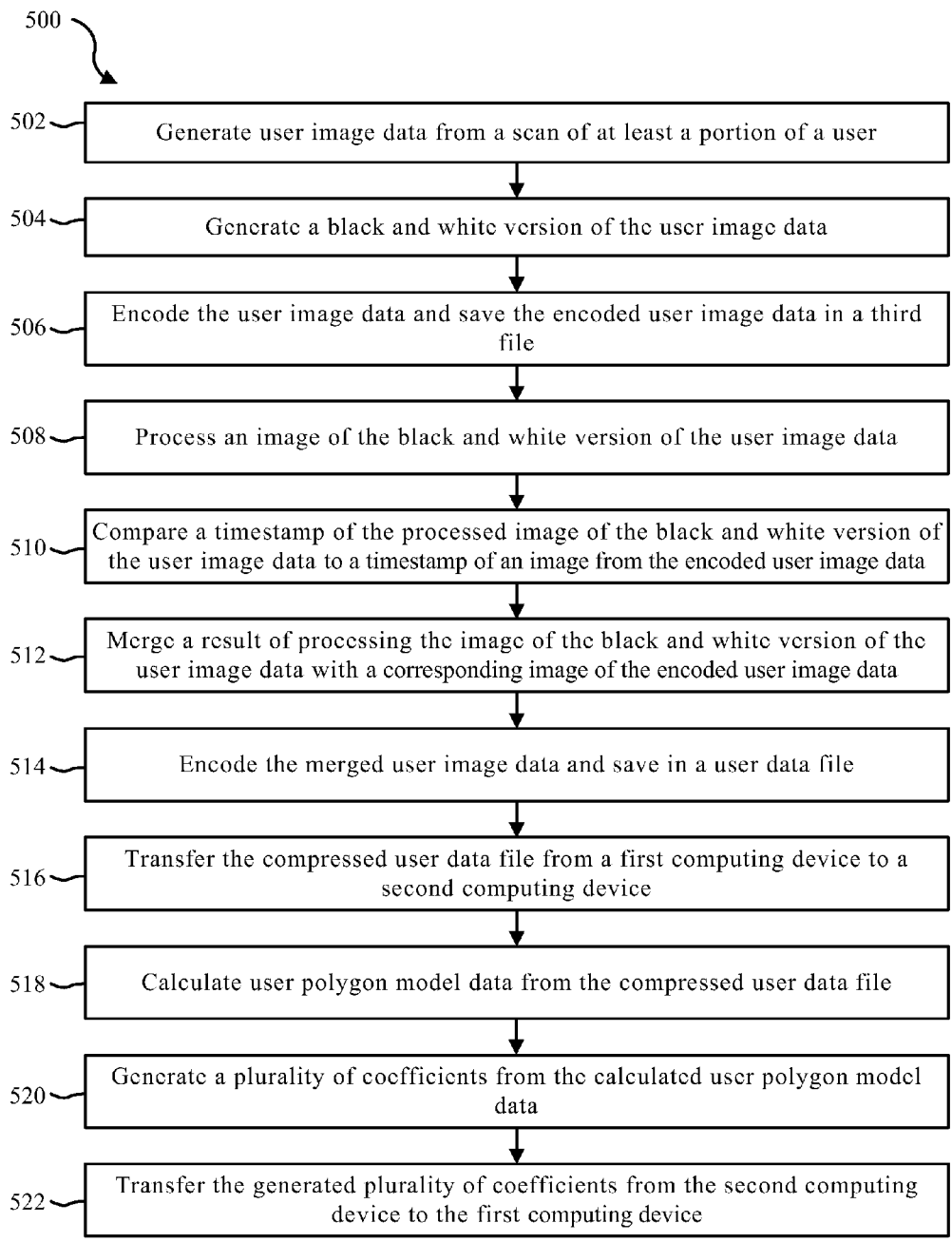
FIG. 5 is a flow diagram illustrating one embodiment of a method to process user image data.

FIG. 5 is a flow diagram illustrating one embodiment of a method to process user image data. In some configurations, the method 500 may be implemented by the image processor 104 illustrated in FIGS. 1, 2, and/or 3. In some configurations, the method 500 may be implemented by the application 202 illustrated in FIG. 2.

At block 502, user image data may be generated from a scan of at least a portion of a user. For example, a user's face may be scanned using the video camera on a tablet computing device. At block 504, a black and white version of the user image data may be generated. For example, a video scan of a user's face from ear to ear may be captured in color. A black and white copy of the color version of the scan may be generated for efficient processing of the scanned image data.

At block 506, the user image data may be encoded and the encoded user image data may be saved in a third file. For example, the scan of an object may produce a first file storing the polygon model data of the object and a second file storing the texture map data of the object. A scan of a user may produce a third file.

At block 508, an image of the black and white version of the user image data may be processed. Processing a black and white copy of the full-color scan of the user conserves computing resources by reducing computing overhead. At block 510, a timestamp of the processed image of the black and white version of the user image data may be compared to a timestamp of an image from the full-color encoded user image data. Upon determining a match, a result of processing the image of the black and white version of the user image data may be merged with a corresponding image of the encoded user image data.

At block 514, the merged user image data may be encoded and saved in a user data file. At block 516, the encoded user data file may be transferred from a first computing device to a second computing device. For example, the encoded user data file may be transferred over the network 204 from a device 102 to a server 206 for further processing at the server 206. Alternatively, in some embodiments, the encoded user data file remains on the device 102 and is processed at the device 102.

At block 518, user polygon model data may be calculated from the encoded user data file. As explained above, in some embodiments, the polygon model data may be calculated at the server 206. Alternatively, the polygon model data may be calculated at the device 102.

At block 520, a plurality of coefficients may be generated from the calculated user polygon model data. At block 522, the generated plurality of coefficients may be transferred from the second computing device to the first computing device. For example, the generated plurality of coefficients may be transferred from the server 206 to a device 102. From the received plurality of coefficients, the polygon mesh module 304 may be configured to generate a polygon mesh model of the user. Alternatively, the polygon mesh module 304 generates a polygon mesh model of the user from the scan of the user.

Figure 6:
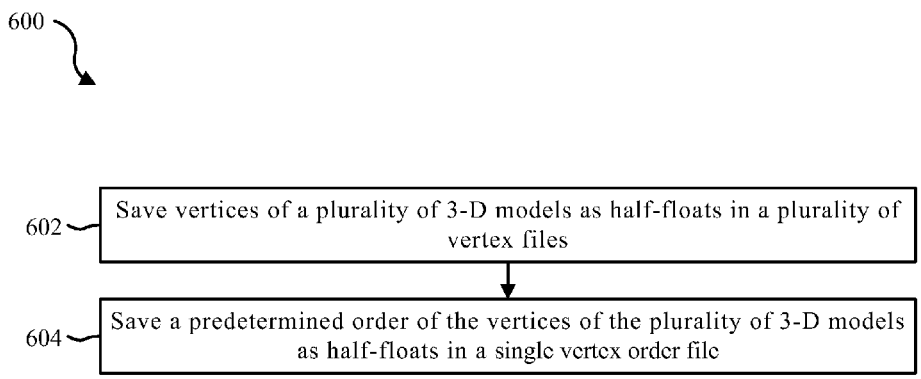
FIG. 6 is a flow diagram illustrating one embodiment of a method to store polygon mesh vertices.

FIG. 6 is a flow diagram illustrating one embodiment of a method 600 to store polygon mesh vertices. In some configurations, the method 600 may be implemented by the image processor 104 illustrated in FIGS. 1, 2, and/or 3. In some configurations, the method 600 may be implemented by the application 202 illustrated in FIG. 2.

At block 602, vertices of a plurality of 3-D models may be stored as half-floats in a plurality of vertex files. For example, vertices of a 3-D model of a pair of glasses and a 3-D model of a user may be stored as half-floats. Additionally, or alternatively, the database 110 may include a morphable model. The morphable model may be configured to morph into the calculated shape of the user's head determined from the scan of the user. Thus, in some configurations, vertices of the morphable model may be saved as half-floats in a plurality of vertex files, where the vertices of the morphable model have a certain order. At block 604, a predetermined order of the vertices of the plurality of 3-D models (e.g., morphable model) may be stored as half-floats in a single vertex order file.

Figure 7:
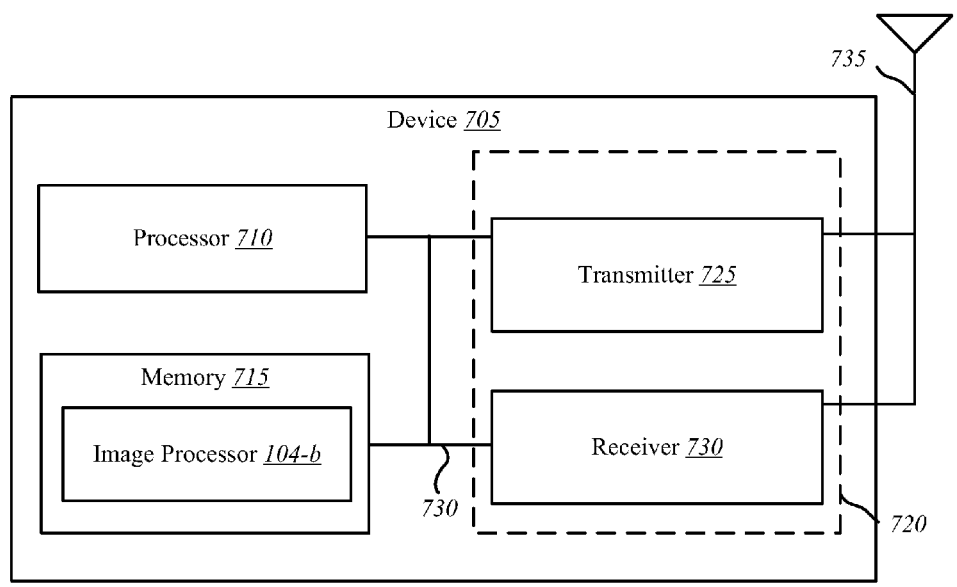
FIG. 7 depicts a block diagram of a computer system suitable for implementing the present systems and methods.

FIG. 7 depicts a block diagram of a computer system 700 suitable for implementing the present systems and methods. In one embodiment, the computer system 700 may include a mobile device 705. The mobile device 705 may be an example of a device 102 depicted in FIGS. 1, 2, and/or 3. As depicted, the mobile device 705 includes a bus 730 which interconnects major subsystems of mobile device 705, such as a central processor 710, a system memory 715 (typically RAM, but which may also include ROM, flash RAM, or the like), and a transceiver 720 that includes a transmitter 730, a receiver 735, and an antenna 740.

Bus 730 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the image processor 104-*b* to implement the present systems and methods may be stored within the system memory 715. The image processor 104-*b* may be one example of the image processor 104 depicted in FIGS. 1, 2, and/or 3. In some embodiments, the transmitter 725 may be configured to transfer the compressed user data file from the mobile device 705 to a second computing device (e.g., server 206). In some configurations, the receiver 730 may be configured to receive the generated plurality of coefficients from the second computing device (e.g., server 206) to the mobile device 705.

Applications resident with mobile device 705 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 8:
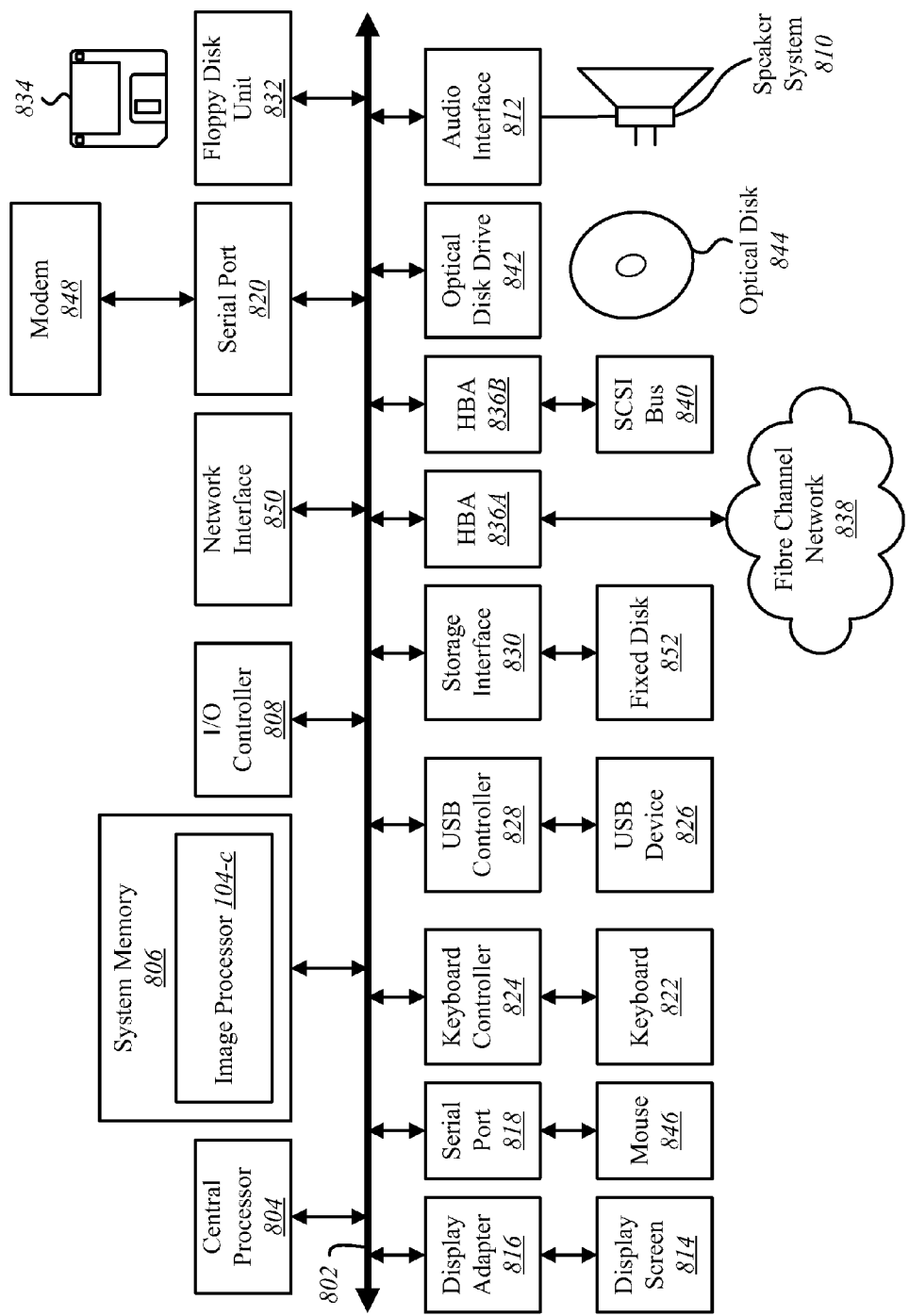
FIG. 8 depicts a block diagram of a computer system suitable for implementing the present systems and methods.

FIG. 8 depicts a block diagram of a computer system 800 suitable for implementing the present systems and methods. The depicted computer system 800 may be one example of a server 206 depicted in FIG. 2. Alternatively, the system 800 may be one example of a device 102 depicted in FIG. 1 or 2, or the mobile device 705 depicted in FIG. 7. Computer system 800 includes a bus 802 which interconnects major subsystems of computer system 800, such as a central processor 804, a system memory 806 (typically RAM, but which may also include ROM, flash RAM, or the like), an input/output controller 808, an external audio device, such as a speaker system 810 via an audio output interface 812, an external device, such as a display screen 814 via display adapter 816, serial ports 818 and mouse 820, a keyboard 822 (interfaced with a keyboard controller 824), multiple USB devices 826 (interfaced with a USB controller 828), a storage interface 830, a host bus adapter (HBA) interface card 836A operative to connect with a Fibre Channel network 838, a host bus adapter (HBA) interface card 836B operative to connect to a SCSI bus 840, and an optical disk drive 842 operative to receive an optical disk 844. Also included are a mouse 846 (or other point-and-click device, coupled to bus 802 via serial port 818), a modem 848 (coupled to bus 802 via serial port 820), and a network interface 850 (coupled directly to bus 802).

Bus 802 allows data communication between central processor 804 and system memory 806, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the image processor 104-c to implement the present systems and methods may be stored within the system memory 806. The image processor 104-c may be one example of the image processor 104 depicted in FIGS. 1, 2, 3, and/or 7. Applications resident with computer system 800 are generally stored on and accessed via a non-transitory computer readable medium, such as a hard disk drive (e.g., fixed disk 852), an optical drive (e.g., optical drive 842), or other storage medium. Additionally, applications can be in the form of electronic signals modulated in accordance with the application and data communication technology when accessed via network modem 848 or interface 850.

Storage interface 830, as with the other storage interfaces of computer system 800, can connect to a standard computer readable medium for storage and/or retrieval of information, such as a fixed disk drive 852. Fixed disk drive 852 may be a part of computer system 800 or may be separate and accessed through other interface systems. Modem 848 may provide a direct connection to a remote server via a telephone link or to the Internet via an internet service provider (ISP). Network interface 850 may provide a direct connection to a remote server via a direct network link to the Internet via a POP (point of presence). Network interface 850 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of at least some of the computer system 800 such as that shown in FIG. 8 is readily known in the art and is not discussed in detail in this application. Code to implement the present disclosure can be stored in a non-transitory computer-readable medium such as one or more of system memory 806, fixed disk 852, or optical disk 844. The operating system provided on computer system 800 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for processing virtual 3-D data efficiently, the method comprising:
    generating, via a processor of a mobile computing device, user image data from a scan of a user, wherein the scan includes a plurality of images including a portion of a user, the scan being from a first area of the user to a second area of the user captured by relative movement between a camera of the mobile computing device and the portion of the user;
    generating, via the processor, object polygon model data and object texture map data from the user image data;
    saving, via the processor, the object polygon model data in a first object file;
    encoding, via the processor, the object texture map data;
    saving, via the processor, the encoded object texture map data in a second object file, wherein a data format of the second object file is different than a data format of the first object file;
    encoding the user image data and saving the encoded user image data in a third file;
    transferring the encoded user image data file from the mobile computing device to a second computing device;
    calculating user polygon model data from the encoded user image data file and generating a plurality of coefficients from the calculated user polygon model data on the second computing device; and
    transferring the generated plurality of coefficients from the second computing device to the mobile computing device.

2. The method of claim 1, further comprising:
    creating a black and white version of the user image data; and
    processing an image of the black and white version of the user image data.

3. The method of claim 2, further comprising:
    comparing a timestamp of the processed image of the black and white version of the user image data to a timestamp of an image from the encoded user image data;
    merging a result of processing the image of the black and white version of the user image data with a corresponding image of the encoded user image data; and
    encoding the merged user image data and saving the encoded merged user image data into a user data file.

4. The method of claim 3, wherein the first object file includes a binary-encoded file, and wherein the second object file and the encoded user data file include compressed video files.

5. The method of claim 1, further comprising:
    saving vertices of a plurality of 3-D models as half-floats in a plurality of vertex files.

6. The method of claim 5, further comprising:
    saving a predetermined order of the vertices of the plurality of 3-D models as half-floats in a single vertex order file.

7. A computing device configured to process virtual 3-D data efficiently, comprising:
    a processor of a mobile computing device;
    memory in electronic communication with the processor;
    instructions stored in the memory, the instructions being executable by the processor to:
    generate user image data from a scan of a user, wherein the scan includes a plurality of images including a portion of a user, the scan being from a first area of the user to a second area of the user captured by relative movement between a camera of the mobile computing device and the portion of the user;
    generate object polygon model data and object texture map data from the user image data;
    save the object polygon model data in a first object file;
    encode the object texture map data; and save the encoded object texture map data in a second object file, wherein a data format of the second object file is different than a data format of the first object file;
    encode the user image data and saving the encoded user image data in a third object file;
    transfer the encoded user image data file from the mobile computing device to a remote computing device;
    calculate user polygon model data from the encoded user image data file and generating a plurality of coefficients from the calculated user polygon model data on the remote computing device; and
    transfer the generated plurality of coefficients from the remote computing device to the mobile computing device.

8. The computing device of claim 7, wherein the instructions are executable by the processor to:
    create a black and white version of the user image data; and
    process an image of the black and white version of the user image data.

9. The computing device of claim 8, wherein the instructions are executable by the processor to:
    compare a timestamp of the processed image of the black and white version of the user image data to a timestamp of an image from the encoded user image data;
    merge a result of processing the image of the black and white version of the user image data with a corresponding image of the encoded user image data; and
    encode the merged user image data and save the encoded merged user image data into a user data file.

10. The computing device of claim 9, wherein the first object file includes a binary-encoded file, and wherein the second object file and the encoded user data file include compressed video files.

11. The computing device of claim 7, wherein the instructions are executable by the processor to:
save vertices of a plurality of 3-D models as half-floats in a plurality of vertex files.

12. The computing device of claim 7, wherein the instructions are executable by the processor to:
save a predetermined order of the vertices of the plurality of 3-D models as half-floats in a single vertex order file.

13. A computer-program product for processing virtual 3-D data efficiently, the computer-program product comprising a non-transitory computer-readable medium storing instructions thereon, the instructions being executable by a processor of a mobile computing device to:
generate user image data from a scan of a user, wherein the scan includes a plurality of images including a portion of a user, the scan being from a first area of the user to a second area of the user captured by relative movement between a camera of the mobile computing device and the portion of the user;
generate object polygon model data and object texture map data from the user image data;
save the object polygon model data in a first object file;
encode the object texture map data; and
save the encoded object texture map data in a second object file, wherein a data format of the second object file is different than a data format of the first object file;
encode the user image data and saving the encoded user image data in a third object file;
transfer the encoded user image data file from the computing device to a remote computing device;
calculate user polygon model data from the encoded user image data file and generating a plurality of coefficients from the calculated user polygon model data on the remote computing device; and
transfer the generated plurality of coefficients from the remote computing device to the first computing device.

14. The computer-program product of claim 13, wherein the instructions are executable by the processor to:
create a black and white version of the user image data;
process an image of the black and white version of the user image data;
compare a timestamp of the processed image of the black and white version of the user image data to a timestamp of an image from the encoded user image data;
merge a result of processing the image of the black and white version of the user image data with a corresponding image of the encoded user image data; and
encode the merged user image data and save the encoded merged user image data into a user data file.

15. The computer-implemented method of claim 1, further comprising:
generating, via the processor of the mobile computing device, a 3-D model of the user with the object polygon model data and the object texture map data;
receiving, via the processor of the mobile computing device, a 3-D model of a product; and
displaying, via the processor of the mobile computing device, the 3-D model of a product on the 3-D model of the user.

16. The computing device of claim 8, wherein the instructions are executable by the processor to:
generate a 3-D model of the user with the object polygon model data and the object texture map data;
receive a 3-D model of a product; and
display the 3-D model of a product on the 3-D model of the user.

* * * * *